Nov. 4, 1969

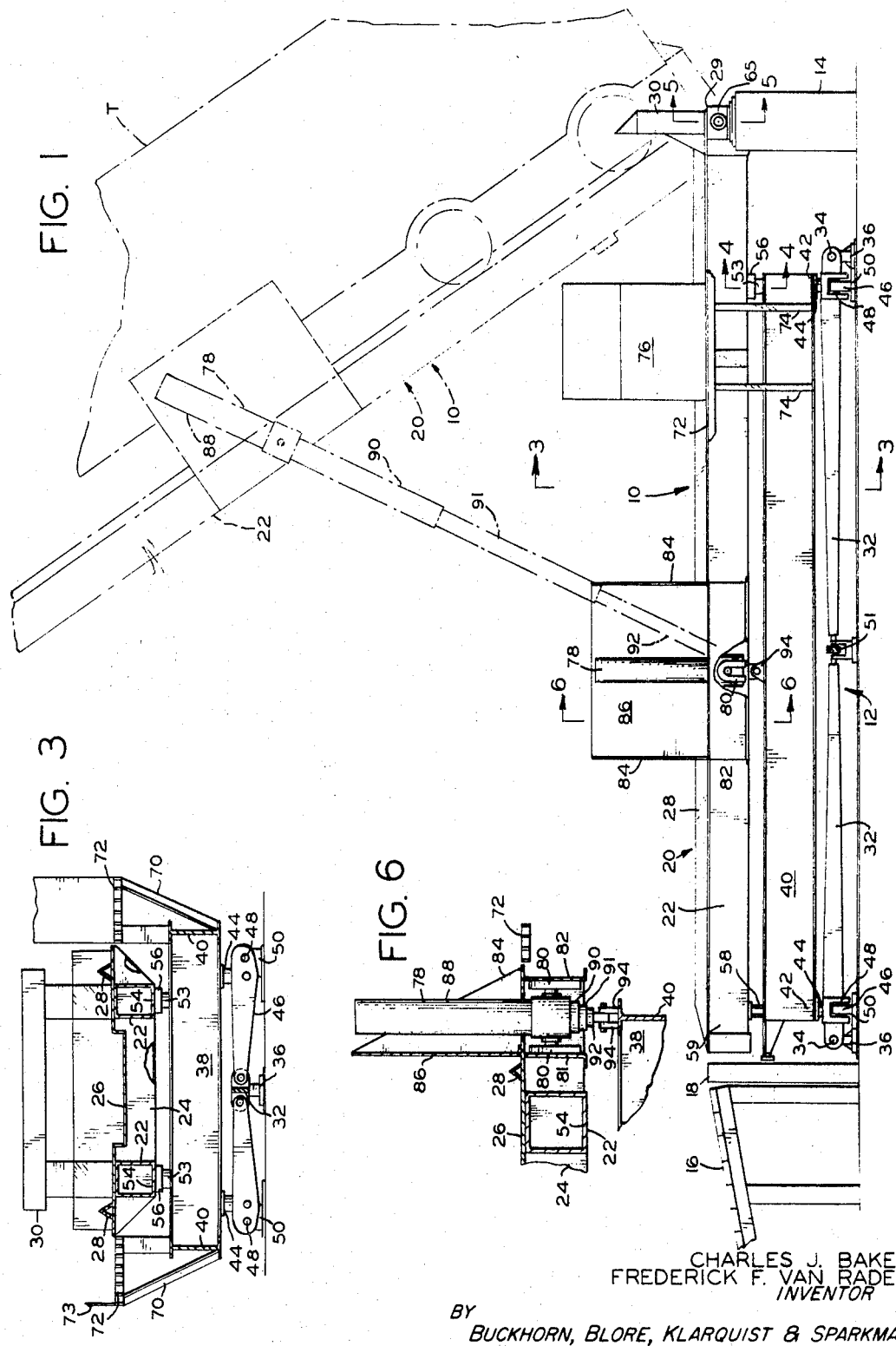

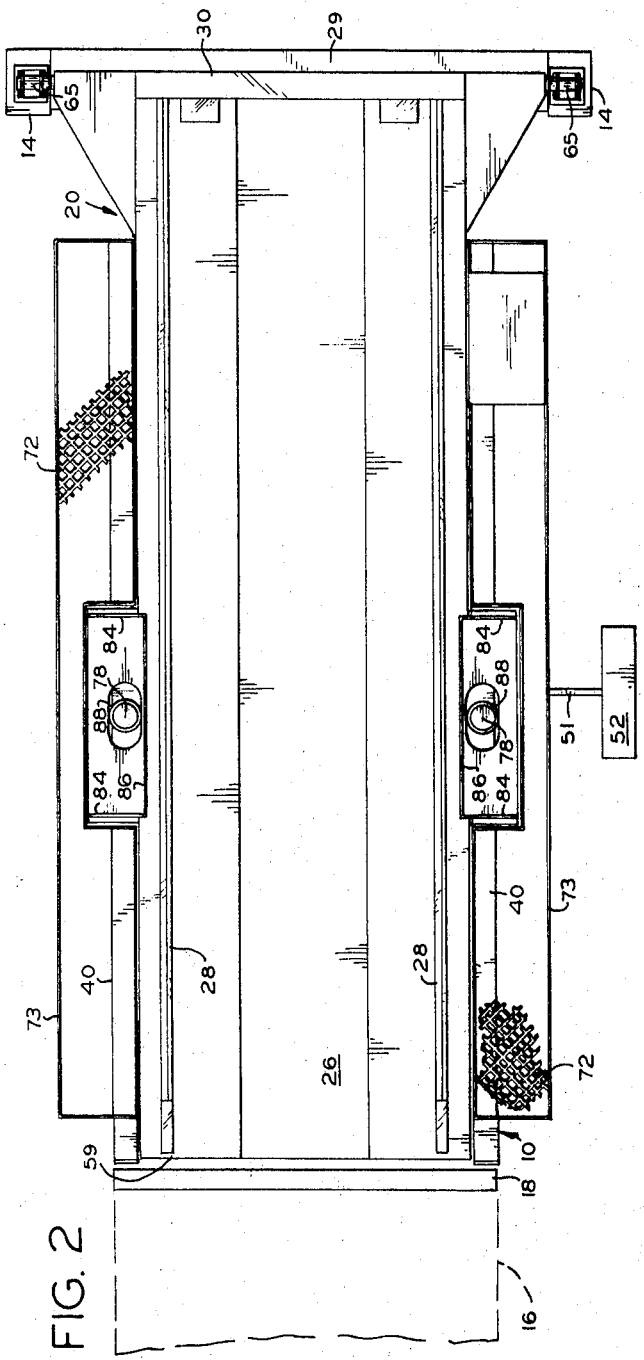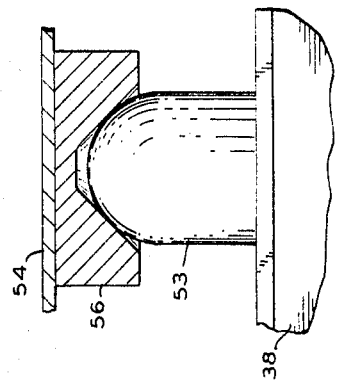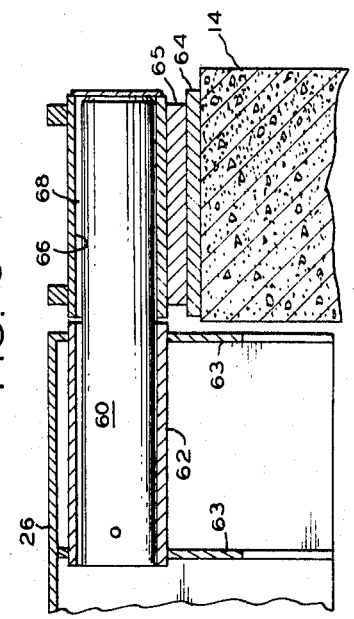

C. J. BAKER ET AL 3,476,269

TRAILER DUMPER

Filed May 6, 1968

CHARLES J. BAKER
FREDERICK F. VAN RADEN
INVENTORS

BY
BUCKHORN, BLORE, KLARQUIST & SPARKMAN
ATTORNEYS

# United States Patent Office 3,476,269
Patented Nov. 4, 1969

3,476,269
TRAILER DUMPER
Charles J. Baker, Portland, and Frederick F. Van Raden, Hillsboro, Oreg., assignors to Peerless Trailer and Truck Service, Inc., Tualatin, Oreg., a corporation of Oregon
Continuation-in-part of application Ser. No. 612,693, Jan. 30, 1967. This application May 6, 1968, Ser. No. 733,207
Int. Cl. B65g 67/40; G01g 19/02
U.S. Cl. 214—2      8 Claims

ABSTRACT OF THE DISCLOSURE

A trailer dumper having a hinged lift comprising two longitudinally extending torsionally resistant box seams spaced apart a distance equal to the transverse distance between the wheels of a truck trailer. The lift is raised by a hydraulic piston and cylinder which transmits the load directly to weigh-bridges beneath the lift, thereby to achieve weighing and dumping on the same apparatus. Means are provided to permit a slight elevation of one end of the lift without removing the weight thereon from the weighbridges, thereby to permit a trailer to be weighed without the necessity of moving the truck.

Background of the invention

This application is a continuation-in-part of our co-pending application Ser. No. 612,693 filed Jan. 30, 1967, now abandoned.

This invention relates to apparatus for the dumping of large truck trailers and, more particularly, to such apparatus which is adapted for use in combination with a highway truck scale.

Truck trailers filled with wood chips and similar commodities require specialized equipment to dump them. Such equipment generally has taken the form of a pivotable or tiltable lift on which the truck trailer is driven and then elevated to empty the contents from the rear thereof. Due to the large size of the trailers and the heavy loads carried therein, the lifts constructed in the past have experienced excessive torsional deformation about the longitudinal axes thereof, and in order to counter this tendency, it has been necessary to provide the lifts with extremely heavy and cumbersome cross-bracing. Such has increased the cost of the lifts while not providing a completely serviceable and satisfactory piece of equipment.

It is thus the primary object of the present invention to provide a trailer dumper that will be lighter in weight and which can be more economically constructed than those heretofore known.

It is a further object of the present invention to provide such a trailer dumper that will be more torsionally resistant than those known heretofore.

It is a still further object of the present invention to provide such a trailer dumper that will be adapted for use with a highway truck scale such that weighing and dumping of a load can be achieved on the same apparatus and at substantially the same time.

It is a still further object of the present invention to provide such a trailer dumper that will enable a trailer to be weighed, both when full and when empty, without having to move the truck completely out of the way of the apparatus.

Summary of the invention

In accordance with these objects, we have provided a trailer dumper comprising a supporting base and a lift hinged at one end to the base and adapted to support a truck trailer. The lift, itself, comprises two longitudinally disposed, torsionally resistant box beams spaced apart a distance substantially equal to the transverse distance between the wheels of a truck trailer when the same is positioned on the lift. The lift further comprises a deck attached to the upper side of the box beams and guide means on the deck to guide the wheels of the trailer over the box beams. A hydraulic cylinder is attached to the side of the lift. A telescoping piston is disposed within the cylinder, and hydraulic pumping means are provided for extending and retracting the piston with respect to the cylinder, thereby pivotally to raise and lower the lift about its hinged end.

Other objects and advantages of the invention will become apparent from the following description and drawings.

Brief description of the drawings

FIG. 1 is a side-elevational view of a trailer dumper and highway truck scale constructed in accordance with the present invention, with the lift thereof shown in its elevated position in dotted lines;
FIG. 2 is a plan view of the apparatus shown in FIG. 1;
FIG. 3 is a sectional view taken on line 3—3 of FIG. 1;
FIG. 4 is a sectional view taken on line 4—4 of FIG. 1;
FIG. 5 is a sectional view taken on line 5—5 of FIG. 1;
FIG. 6 is a sectional view taken on line 6—6 of FIG. 1.

Description of the preferred embodiments

Figure 8:
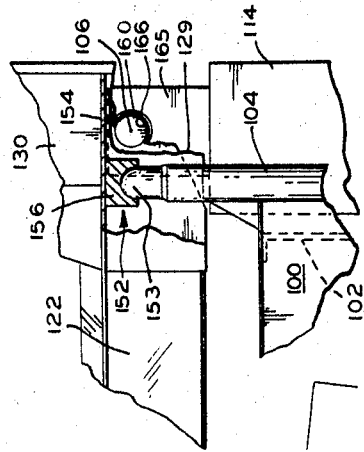
FIG. 8 is a view to an enlarged scale with parts broken away of the hinged end of the embodiment of FIG. 7.

Referring to the drawings and in particular to FIGS. 1, 2, and 3, we have shown a trailer dumper 10 constructed in accordance with our invention in combination with a highway truck scale 12. Concrete supporting pillars 14 are embedded in the ground adjacent one end of the scale 12 and a ramp 16 terminating in a concrete abutment wall 18 is positioned adjacent the other end of the scale 12.

The trailer dumper 10 consists of a lift 20 having two longitudinally disposed box beams 22 (see FIG. 3) joined together by welded steel cross-beams 24. The box beams 22 are also of welded steel construction and are inherently extremely torsionally resistant. They are spaced apart laterally a distance substantially equal to the transverse distance between the wheels of a trailer T when positioned on the lift 20. This method of support for the trailer wherein the box beams are positioned substantially directly under each tire thereof, eliminates all tendency of the lift to flex. A deck plate 26 is welded to the upper surface of the box beams 22. Tire guide rails 28 are welded to the upper surface of the deck 26 to aid in fast positioning of the wheels of the trailer T over the box beams 22. A bumper 30 is welded to the rear end 29 of the lift 20 to hold the trailer T on the lift when the same is in its elevated or dumping position.

Disposed beneath the trailer dumper 10 is a highway truck scale 12 consisting of two scale beams 32 located underneath the longitudinal axis of the dumper and pivotally supported as at 34 on support brackets 36. The box beams 22 are adapted to transfer their load when the lift is in its horizontal position to front and rear cross beams 38 (FIG. 3) which join two longitudinally extending, parallel I-beam weigh-bridges 40 supported at their ends 42 on weighbridge mounts 44. (See FIGS. 1 and 3.) The latter are positioned on transversely extending brackets 46 pivotally supported at 48 on mounts 50 and are adapted to exert downward pressure at their inner ends on the centrally located scale beams 32. (See FIGS. 1 and 3.) The beams 32 in turn exert pressure on a scale cross beam 51 which is attached in conventional manner to a calibrated scale head 52, as shown in FIGS. 1 and 2.

Welded to the rear cross beam 38 under each box beam 22 is a self-centering ball type joint 53 for transmitting load from the lift 20 to the weighbridge 40. (See FIG. 4.) Welded to the bottom plate 54 of each box beam 22 is a socket 56 adapted to receive a ball joint 53, as shown. Welded to the front cross beam 38 (not shown) and positioned under each box beam 22 is a front support 58 (see FIG. 1) adapted to support the front end 59 of the lift 20. The box beams 22 and hence the lift 20 are freely movable with respect to the tops of the front supports 58, thereby to accommodate changes in length of the lift due to thermal expansion or any other reason.

The lift 20 is is provided at its rear end 29 with a pin 60 extending from each side thereof. (See FIGS. 1, 2 and 5.) The pin 60 is supported in a sleeve 62 welded to support plates 63. Bolted to each of the pillars 14 is a support plate 64 to which is welded a trunnion 65 to receive the outstanding ends of each of the pins 60. A feature of the invention is the fact that each of the trunnions 65 has an opening 66 therein larger than the diameter of the pins 60, such that a gap 68 exists. By this means, mating of the ball joints 53 and the sockets 56 is facilitated and when the lift 20 is lowered from its elevated or dumping position to the horizontal position, the weight of the lift is supported solely on the weighbridges 40.

Supported on each of the weighbridges 40 by diagonally extending struts 70 are catwalks 72 made of steel safety grating and equipped with handrails 73. (See FIGS. 2 and 3.) Mounted on one of the catwalks 72 and supported by struts 74 is a hydraulic power unit 76 containing an electric motor, an hydraulic pump and an oil reservoir tank (not shown). The power unit 76 is adapted to supply hydraulic fluid under pressure to an hydraulic cylinder 78 attached to each side of the lift 20. Each of the cylinders 78 is self-centering and is mounted between two universal type U-shaped trunnion mountings 80 welded to stringers 81, 82 running between the cross beams 24 and exterior to the box beams 22. (See FIG. 6.) The load from each of the outermost stringers 82 is transferred by transversely extending triangular plates 84 to longitudinally extending plates 86 and thence inwardly to the stringers 81 and the cross beams 24 and the box beams 22. Disposed within each of the hydraulic cylinders 78 are three cylinder barrels 90, 91, 92, which function as telescoping pistons. Pistons 92 are pivotally attached to brackets 94 welded one to each of the weighbridges 40, as shown in FIGS. 1 and 6, and are adapted to raise the lift 20 to a minimum dumping angle of 55° although greater angles are possible.

Operation of the trailer dumper is as follows. A trailer T is backed up the ramp 16, across the abutment wall 18 and onto the deck 26. Its tires are guided by the rails 28 to position the wheels directly over the box beams 22. The rear of the trailer is positioned so as to be adjacent the bumper 30. After unhitching of the truck, the trailer and its load may be weighed. Thereafter, the end gates of the trailer are opened and the power unit 76 is started to pump hydraulic fluid into the cylinder barrel 78, thereby to extend the telescoping pistons 90, 91, and 92, to raise the lift 20 to the position shown in the dotted lines in FIG. 1. The trailer is then in such position that all of its contents will dump from the rear thereof. Reversing the power unit 76 permits the lift 20 to be lowered onto the ball joints 53 and front supports 58, the enlarged openings 66 in the trunnions 65 facilitating the mating of the ball joints 53 and sockets 56. The empty trailer can then be weighed. Obviously since hydraulic cylinders 78 are supported on the weighbridges 40, the lift 20 is directly and wholly supported on the weighbridges 40, and accurate readings of the empty and full weight of the trailer can be obtained.

Figure 7:
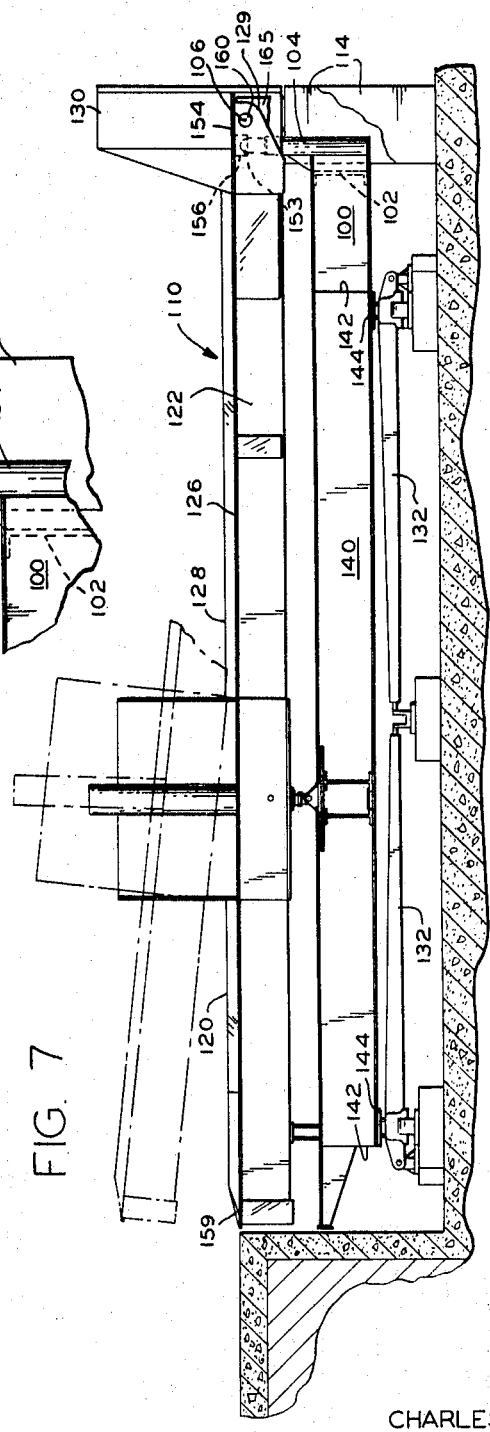
FIG. 7 is a side elevational view of a different embodiment of the present invention.

FIGS. 7 and 8 illustrate another embodiment of our invention. In these figures there is shown a trailer dumper 110 having a lift 120 comprising two box beams 122 to the upper surface of which is welded a deck 126. Tire guide rails 128 and a bumper 130 are provided as aforementioned. The lift 120 is mounted above two weighbridges 140 which are supported at their ends 142 on weighbridge mounts 144. The latter in turn are adapted to exert downward pressure on scale beams 132.

Each of the weighbridges 140 is provided with a horizontally extending member 100, thereby to extend the weighbridges 140 rearwardly toward supporting pillars 114. The members 100 are connected by a crossbeam 102 to which are welded two vertical members 104 extending in elevation to a level just below the axis 106 about which the trailer dumper 110 is adapted to pivot. Self-centering ball joints 152 are provided ot transfer the load from the lift 120 to the weighbridges 140. In the illustrated embodiment, the joints 152 each comprises a ball support 153 mounted one on top of each of the members 104. Each ball support 153 is adapted to mate with a respective socket 156 welded to the bottom of a plate 154 on each of the box beams 122 of the lift.

The lift 120 is further provided with pins 160 extending from each side of the lift at the rear 129 thereof. Pins 160 are received within trunnions 165 mounted on the pillars 114. The diameter of the pins 160 is less than the diameter of the openings 166 in the trunnions 165, thereby to permit a gap to exist therebetween.

In the embodiment shown in FIGS. 7 and 8, the diameters of the pins 160 and the size of the trunnion openings 166 are so chosen that the gap therebetween is sufficient to permit the lift 120 to be tilted slightly without removing all the load thereon from the tops of the ball supports 153. Thus, as the lift 120 is raised, the initial pivoting action actually takes place on top of the ball supports 153. Such will permit the forward end of the lift 159 to be raised sufficiently to take all of the weight of the trailer off the truck while maintaining such weight entirely on the weighbridges 140. Specifically, the various dimensions are chosen in accordance with the following formula:

$$\frac{h}{g} = \frac{L-d}{d}$$

where $h$ is the distance that it is desired to be able to raise the front end 159 of the lift 120 without removing the weight thereon from the weighbridges 140;

$g$ is the gap between the lower surfaces of the openings 166 in the trunnions 165 and the pins 160 when the lift is in a horizontal position;

$L$ is the overall length of the lift 120; and $d$ is the horizontal distance between the centerlines of the ball supports 153 and the axis 106 of the lift.

Thus, as the lift 120 is raised, it initially pivots on the tops of the ball supports 153 until the pins 160 make contact with the lower surfaces of the openings 166 in the trunnions 165. The lift 120 then pivots on the pins 160. The elevation of the lift at the time the pins 160 make contact with the openings 166 in the trunnions 165 then defines the limit of elevation of the lift below which the entire weight thereon remains on the weighbridges 140. (See phantom line structure in FIG. 7.)

A lift having a 32 foot, 6 inch deck (L) was constructed having the centerlines of the ball supports 153 approximately 9 inches inboard of the axis 106($d$). The diameter of the pins 160 was 6 inches. The openings 166 in the trunnions 165 were elliptical, having a vertical dimension of 6⅝ inches and a horizontal dimension of 6⁵⁄₁₆ inches. The gap $g$ was thus $$g = \frac{1}{2}(6⅝ - 6) = ⁵⁄₁₆ \text{ inch}$$

The front end of the lift was able to be raised approximately 18 inches ($h$) before the weight thereon was removed from the weightbridges.

Operation of this embodiment of the invention provides for certain advantages not heretofore available. When a truck trailer is backed onto the deck 126, its tires are guided by the rails 128 to a position directly over the box beams 122 and with the rear of the trailer adjacent bumper 130. The landing gear or parking supports at the front end of the trailer may then be lowered. However, in most trailers for hauling chips the landing gear is allowed to remain in a raised position (about 8 to 10 inches above the ground). Next the truck is moved forward sufficiently to clear the king pin of the fifth wheel from the notch in the truck's fifth wheel, which requires a movement of the truck of only about 6 to 12 inches.

The lift 120 is then raised slightly to engage the landing gear and to elevate the trailer from the truck and place the full weight of the trailer on the weighbridges 140. The trailer is then weighed. As long as the lift is not raised above the position shown in the phantom lines in FIG. 7, that is, as long as the front end of the lift 159 is not raised more than the distance $h$ as set forth in the above formula, the weight of the trailer remains entirely on the weighbridges 140 because the ball supports 153 are still in contact with their respective sockets 156, the pins 160 not making bearing contact with the lower surfaces of the enlarged openings 166 in the trunnions 165. After getting the full weight, the lift is then completely raised to dump the contents from the trailer. Thereafer the lift is lowered until the ball supports 153 and sockets 156 mate, and the empty weight of the trailer obtained. Finally, the trailer is lowered all the way and the trucked backed up to rehitch it to the trailer to complete the operation.

Thus, an accurate weighing of the trailer and its contents can be obtained while the lift is in a slightly elevated position, and it is not necessary to move the truck out of the way and then lower the lift as has been required heretofore to obtain the weight.

In the foregoing description, the invention has been described with reference to certain particular preferred embodiments, although it is to be understood that these specific details shown are merely illustrative. For example, the dumper apparatus can be utilized with appropriate modification to the dumping of other vehicles, such as, for example, rail cars having an end opening gate.

We claim:
1. In combination:
a vehicle scale;
a weighbridge adapted to exert pressure on said scale; and
a tiltable vehicle dumper mounted above said weighbridge and adapted to support a vehicle and tilt it from a generally horizontal position to a tilted position in which its contents can be dumped therefrom, said vehicle dumper comprising a supporting base positioned adjacent said scale,
a lift adapted to support said vehicle,
hinge means operatively connecting one end of said lift to said supporting base to permit tilting of said lift about said one end, said lift when in its horizontal position being wholly supported by said weighbridge and free of support by said supporting base,
a hydraulic cylinder and piston means operatively connected between the side of said lift and said weighbridge, and
means to pump hydraulic fluid into said hydraulic cylinder and piston means to extend the same, thereby to pivot said lift about said end and dump the contents of said vehicle supported thereon.

2. The combination of claim 1, further comprising:
a ball joint between said weighbridge and said lift, said ball joint comprising:
a ball support, and
a socket to receive said ball support when said lift is in said horizontal position,
said joint being adapted to transmit load from said lift to said weighbridge.

3. The combination of claim 1 wherein said hinge means comprises:
a pin at said end of said lift, and
a trunnion mounted on said supporting base and adapted to receive said pin to enable said lift to pivot about said end,
said trunnion having an opening larger than the diameter of said pin, thereby to permit a gap to exist therebetween.

4. The combination of claim 3, in which the length of said lift, the distance said ball support is mounted away from the centerline of said trunnion, and the amount of said gap between said opening in said trunnion and said pin are selected according to the relationship $$\frac{h}{g} = \frac{L-d}{d}$$

whereby the front end of said lift can be raised a distance $h$ without removing the weight thereon from said weighbridge,
$g$ being the gap between the lower surface of said opening in said trunnion and said pin when said lift is in said horizontal position,
$L$ being the length of said lift, and
$d$ being the distance between the centerline of said ball support and said centerline of said trunnion.

5. The combination of claim 1, further comprising a front support on said weighbridge for supporting the front end of said lift when the same is in said horizontal position, said lift being freely movable with respect to the top of said front support to accommodate changes in the length of said lift.

6. The combination of claim 1, in which said lift comprises two longitudinally disposed box beams spaced apart a distance substantially equal to the transverse distance between the wheels of said vehicle when said vehicle is positioned on said lift.

7. The combination of claim 6, further comprising a deck attached to the upper surface of said box beams, and guides on said deck to guide said wheels of said vehicle over said box beams.

8. The combination of claim 7, further comprising a bumper mounted on said deck at said rear end of said lift to restrain said vehicle when said lift is in its dumping position.

References Cited
UNITED STATES PATENTS

| | | | |
|---|---|---|---|
| 1,403,805 | 1/1922 | Meyer et al. | 214—49 |
| 2,761,573 | 9/1956 | Fulper | 214—49 |
| 2,867,337 | 1/1959 | Erickson | 214—2 |

ROBERT G. SHERIDAN, Primary Examiner

U.S. Cl. X.R.
214—49